US010622141B2

United States Patent
(12) United States Patent
Kawai et al.

(10) Patent No.: US 10,622,141 B2
(45) Date of Patent: Apr. 14, 2020

(54) WIRELESS POWER FEEDING SYSTEM

(71) Applicant: MURATA MANUFACTURING CO., LTD., Kyoto-fu (JP)

(72) Inventors: Nobuhiro Kawai, Nagaokakyo (JP); Yuki Maeda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 168 days.

(21) Appl. No.: 15/655,127

(22) Filed: Jul. 20, 2017

(65) Prior Publication Data

US 2018/0075967 A1 Mar. 15, 2018

(30) Foreign Application Priority Data

Sep. 14, 2016 (JP) ................................ 2016-179061

(51) Int. Cl.

| | |
|---|---|
| ***H01F 38/00*** | (2006.01) |
| ***H01F 38/14*** | (2006.01) |
| ***H02J 50/80*** | (2016.01) |
| ***H02J 50/12*** | (2016.01) |
| ***H02J 7/02*** | (2016.01) |
| ***H04B 5/00*** | (2006.01) |

(52) U.S. Cl.

CPC .............. *H01F 38/14* (2013.01); *H02J 7/025* (2013.01); *H02J 50/12* (2016.02); *H02J 50/80* (2016.02); *H04B 5/0037* (2013.01); *H04B 5/0093* (2013.01)

(58) Field of Classification Search

USPC .......................................................... 307/104

See application file for complete search history.

(56) References Cited

FOREIGN PATENT DOCUMENTS

| | | | |
|---|---|---|---|
| JP | 2013021887 | A | 1/2013 |
| JP | 2014-023323 | A | 2/2014 |
| WO | 2015108153 | A1 | 7/2015 |

OTHER PUBLICATIONS

An Office Action; "Notification of Reasons for Refusal," Mailed by the Japanese Patent Office dated Jan. 22, 2019, which corresponds to Japanese Patent Application No. 2016-179061 and is related to U.S. Appl. No. 15/655,127; with English language translation.

*Primary Examiner* — Rexford N Barnie
*Assistant Examiner* — Dru Parries
(74) *Attorney, Agent, or Firm* — Studebaker & Brackett PC

(57) ABSTRACT

A wireless power feeding system includes a power transmission device and a power reception device. A power transmission circuit in the power transmission device switches high-frequency power supplied to a power transmission coil. When a reset IC in the power reception device detects switching of high-frequency power by the power transmission circuit, the power reception device changes an input impedance seen from the power transmission circuit to the side where a load circuit is disposed on the basis of the content of a signal to be transmitted to the power transmission device. The power transmission device detects the change in the input impedance and obtains the content of the signal.

3 Claims, 4 Drawing Sheets

301
LOAD CIRCUIT
23
VOLTAGE DETECTION CIRCUIT
26
TRANSMISSION SIGNAL CONTROL CIRCUIT
27
22
C22
25
RECTIFIER CIRCUIT
201
Reset IC
28
24
C21
Q2
21
20
10
11
C10
12
SW CIRCUIT
13
CONTROL CIRCUIT
14
101
R1
idc
C11
E

WIRELESS POWER FEEDING SYSTEM

CROSS REFERENCE TO RELATED APPLICATIONS

This application claims benefit of priority to Japanese Patent Application 2016-179061 filed Sep. 14, 2016, the entire content of which is incorporated herein by reference.

TECHNICAL FIELD

The present disclosure relates to a wireless power feeding system for wirelessly feeding high-frequency power from a power transmission device to a power reception device.

BACKGROUND

In a wireless power feeding system for wirelessly feeding power from a power transmission device to a power reception device by magnetic-field coupling, the power transmission device includes a power transmission coil, and the power reception device includes a power reception coil. One example of that wireless power feeding system is illustrated in Japanese Unexamined Patent Application Publication No. 2014-23323. In that illustrated wireless power feeding system, the power reception device transmits a signal to the power transmission device, and the power transmission device grasps the state of the power reception device.

In the wireless power feeding system illustrated in Japanese Unexamined Patent Application Publication No. 2014-23323, at the time of transmission of a signal from the power reception device to the power transmission device, power transport from the power transmission device to the power reception device is interrupted, power transport timing at which power is transported from the power transmission device to the power reception device and signal transmission timing at which a signal is transmitted from the power reception device to the power transmission device are alternately repeated, and power is transported from the power transmission device to the power reception device and signals are transmitted from the power reception device to the power transmission device.

In this wireless power feeding system, the power transmission device includes a detection circuit for detecting impedance on the load side, the detection circuit detects a change in the load impedance of the power transmission coil during the power transport and detects a signal transmitted to the side where the power transmission device is disposed. The power transmission device cannot grasp timing at which a signal is sent by the power reception device. Thus, the power transmission device causes the detection circuit to operate constantly so as not to fail to detect signals from the power reception device. This raises a problem that power consumption of the side where the power transmission device is disposed is increased.

SUMMARY

Accordingly, it is an object of the present disclosure to provide a wireless power feeding system capable of reliably transmitting signals from a power reception device to a power transmission device while suppressing power consumption.

According to preferred embodiments of the present disclosure, a wireless power feeding system includes a power transmission device and a power reception device. The power transmission device includes a power transmission coil and a power transmission circuit configured to supply high-frequency power to the power transmission coil. The power reception device includes a power reception coil electromagnetic-field coupled to the power transmission coil and a power reception circuit configured to convert the high-frequency power received by the power reception coil into direct-current power, and the power reception device is connected to a load circuit that consumes the direct-current power. The power transmission circuit in the power transmission device switches the high-frequency power supplied to the power transmission coil. The power reception device further includes a switching detection circuit and a transmission signal control circuit. The switching detection circuit is configured to detect the switching of the high-frequency power by the power transmission circuit. The transmission signal control circuit is configured to change an input impedance seen from the power transmission circuit to a side where the load circuit is disposed on the basis of the content of a signal to be transmitted to the power transmission device when the switching detection circuit detects the switching of the high-frequency power. The power transmission device further includes a signal obtaining portion configured to detect the change in the input impedance and obtain the content of the signal.

According to this configuration, switching the high-frequency power in the power transmission device triggers the power reception device to output a signal to the power transmission device. That is, the power transmission device can grasp timing at which a signal is transmitted from the power reception device. Thus, the power transmission device does not need to continuously perform sampling, and power consumption can be reduced. Because the power transmission device can grasp the timing at which a signal is transmitted, it can detect the signal reliably.

The power transmission circuit may stop supplying the high-frequency power to the power transmission coil and switch the high-frequency power, and the switching detection circuit may detect the stopping of the supplying of the high-frequency power.

According to this configuration, the power transmission device can easily generate a trigger for transmitting a signal.

The stopping of the supplying of the high-frequency power to the power transmission coil may be a momentary power interruption.

According to this configuration, a short stop of the supply of the high-frequency power can be used as a trigger.

The signal obtaining portion may detect the change in the input impedance after a lapse of a predetermined time after the power transmission circuit switches the high-frequency power.

The input impedance may not be detected accurately in a period immediately after the high-frequency power is switched. According to the above-described configuration, because the change in the input impedance is detected (sampled) after the lapse of that period, unnecessary sampling can be avoided.

According to the preferred embodiments of the present disclosure, the power transmission device does not need to continuously perform sampling, and power consumption can be reduced. Because the power transmission device can grasp timing at which a signal is transmitted, it can detect the signal reliably.

Other features, elements, characteristics and advantages of the present disclosure will become more apparent from the following detailed description of preferred embodiments of the present disclosure with reference to the attached drawings.

DETAILED DESCRIPTION

Figure 1:
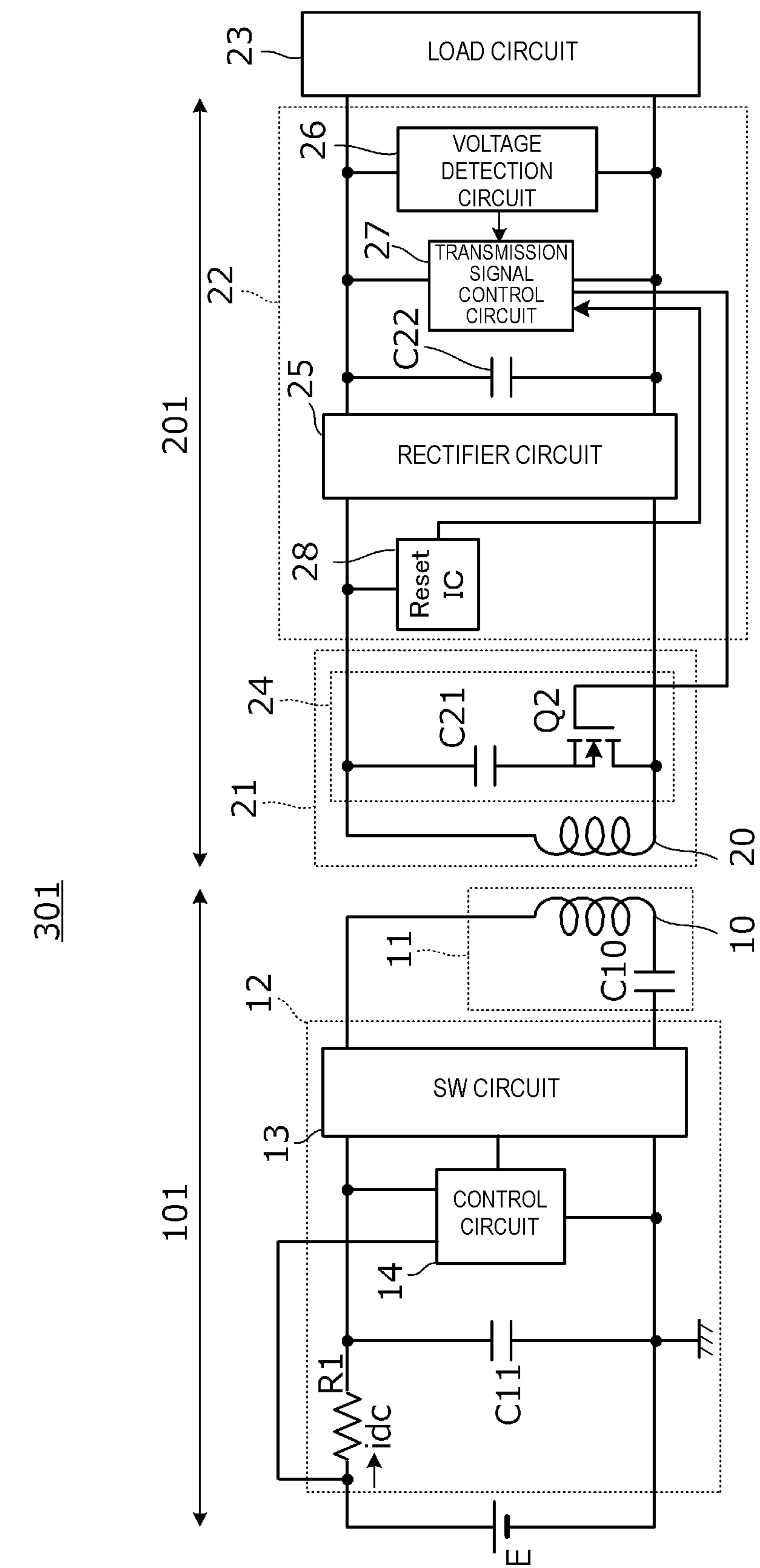
FIG. 1 is a circuit diagram of a wireless power transmission device, a wireless power reception device, and a wireless power feeding system including them according to an embodiment.

FIG. 1 is a circuit diagram of a wireless power transmission device, a wireless power reception device, and a wireless power feeding system including them according to an embodiment.

A wireless power feeding system 301 includes a wireless power transmission device 101 and a wireless power reception device 201. Hereinafter, the wireless power transmission device 101 is simply referred to as "power transmission device 101." Hereinafter, the wireless power reception device 201 is simply referred to as "power reception device 201." The wireless power feeding system 301 according to the present embodiment can transmit power from the power transmission device 101 to the power reception device 201 and transmit signals from the power reception device 201 to the power transmission device 101.

The power transmission device 101 includes a power transmission resonant circuit 11 and a power transmission circuit 12.

The power transmission resonant circuit 11 includes a power transmission coil 10 and a resonant capacitor C10.

The power transmission circuit 12 supplies high-frequency power to the power transmission coil 10 in the power transmission resonant circuit 11. The power transmission circuit 12 includes a switching circuit 13, a control circuit 14, a current detection resistor R1, and a capacitor C11. The control circuit 14 turns on or off the switching circuit 13. By performing switching control on the switching circuit 13, a resonant current flows in the power transmission resonant circuit 11. The power transmission resonant circuit 11 is operable at a resonant frequency suited for feeding power. One example of the resonant frequency may be a frequency in the range from about 6 MHz to about 14 MHz, and in particular, it may be about 6.78 MHz, which is one of the industrial, scientific and medical (ISM) radio bands.

An input direct current idc supplied from an input power source E to the power transmission circuit 12 flows in the current detection resistor R1. The control circuit 14 detects the input direct current idc supplied from the input power source E by reading a voltage drop caused by the current detection resistor R1.

The capacitor C11 stabilizes an input voltage and suppresses harmonic components of a voltage and a current.

The power reception device 201 includes a power reception resonant circuit 21 and a power reception circuit 22. The power reception device 201 is further connected to a load circuit 23. The load circuit 23 consumes direct-current power converted by the power reception circuit 22, and one example thereof may be a battery.

The power reception resonant circuit 21 includes a power reception coil 20 magnetic-field coupled to the power transmission coil 10 and a series circuit 24 including a resonant capacitor C21 and a switching element Q2. The series circuit 24 is connected in parallel with the power reception coil 20. The power reception coil 20 is electromagnetic-field coupled to the power transmission coil 10.

In this electromagnetic-field coupling, the power transmission resonant circuit 11 and the power reception resonant circuit 21, which are spaced apart from each other, interact with each other by magnetic-field coupling, electric-field coupling, or a combination thereof. Magnetic-field energy and electric-field energy possessed by the resonant circuits are joined and exchanged, and vibrations occur. In the power transmission resonant circuit 11, magnetic-field energy and electric-field energy possessed by the power transmission coil and the resonant capacitor C10 are exchanged mainly therebetween, and electric vibrations occur. In the power reception resonant circuit 21, magnetic-field energy and electric-field energy possessed by the power reception coil 20 and the resonant capacitor C21 are exchanged mainly therebetween, and electric vibrations occur. When they satisfy conditions for electromagnetic-field resonance, electromagnetic-field resonance is established.

The switching element Q2 in the series circuit 24 is subjected to on-off control by a transmission signal control circuit 27 described below on the basis of a signal to be transmitted to the power transmission device 101. When the switching element Q2 is in an on state, a resonant frequency f0 of the power reception resonant circuit 21 is defined by the capacitance of the resonant capacitor C21 and the inductance of the power reception coil 20. When the switching element Q2 is in an off state, the resonant frequency of the power reception resonant circuit 21 deviates from the resonant frequency f0. That is, the input impedance seen from the power transmission device 101 to the side where the power reception device 201 is disposed is changed by switching the on or off state of the switching element Q2.

Because the input direct current idc detected by the control circuit 14 on the side where the power transmission device 101 is disposed is a current supplied from the input power source E to the power transmission resonant circuit 11, it changes with a change in load (input impedance) on the side where the power reception device 201 is disposed. The control circuit 14 compares the detected input direct current idc with a threshold and obtains "1" or "0" (sampling). The control circuit 14 reads a signal transmitted from the power reception device 201 by this sampling. The control circuit 14 is an example of "signal obtaining portion" according to the preferred embodiments of the present disclosure.

The power reception circuit 22 converts high-frequency power received by the power reception coil 20 into direct-current power. The power reception circuit 22 includes a rectifier circuit 25, a capacitor C22, a voltage detection circuit 26, a transmission signal control circuit 27, and a reset IC 28.

The rectifier circuit 25 rectifies a resonant voltage of the power reception resonant circuit 21. The capacitor C22 smooths the rectified voltage. The voltage detection circuit 26 detects an output voltage of the power reception circuit 22 (voltage to be supplied to the load circuit 23). The transmission signal control circuit 27 switches the on or off state of the switching element Q2 on the basis of a signal to be transmitted to the power transmission device 101. In this way, the resonant frequency of the power reception resonant circuit 21 described above is switched, and the signal is transmitted to the side where the power transmission device 101 is disposed.

Here, examples of the content of the signal transmitted to the power transmission device 101 may include information on charging of the load circuit 23 (full charging or not), the presence or absence of an anomaly in the load circuit 23, and the presence or absence of an anomaly in the output voltage detected by the voltage detection circuit 26. The power transmission device 101 having received such a signal performs processing, such as stopping or limiting transmission of power to the power reception device 201.

The reset IC 28 detects the voltage level in a power source line in the power reception device 201. When the voltage level in the power source line becomes lower than a threshold Th because of a momentary power interruption or short break of power transmission, a sharp decrease in the value of high-frequency power being transmitted, or other reason, the reset IC 28 outputs an L-level signal to the transmission signal control circuit 27. In response to the L-level signal from the reset IC 28, the transmission signal control circuit 27 switches the on or off state of the switching element Q2 and changes the input impedance. That is, the L-level signal from the reset IC 28 acts as a trigger to start transmitting a signal from the power reception device 201 to the power transmission device 101.

In particular, when power transmission from the power transmission device 101 to the power reception device 201 is stopped by a momentary power interruption, a short break, or the like, the voltage level in the power source line in the power reception device 201 decreases more quickly. The reset IC 28 detects the decrease in the voltage level and outputs an L-level signal. That is, the power reception device 201 detects the stopping of the supplying of power based on power transmission from the power transmission device 101, and the stopping triggers the power reception device 201 to start transmission of a signal to the power transmission device 101.

The reset IC 28 is an example of a "switching detection circuit" according to the preferred embodiments of the present disclosure.

The positions of the transmission signal control circuit 27 and the reset IC 28 may not be the positions illustrated in FIG. 1. For example, the reset IC 28 may be disposed at a subsequent stage to the rectifier circuit 25 (nearer the load circuit 23).

Transmission of signals from the power reception device 201 to the power transmission device 101 is described in detail below.

Figure 2:
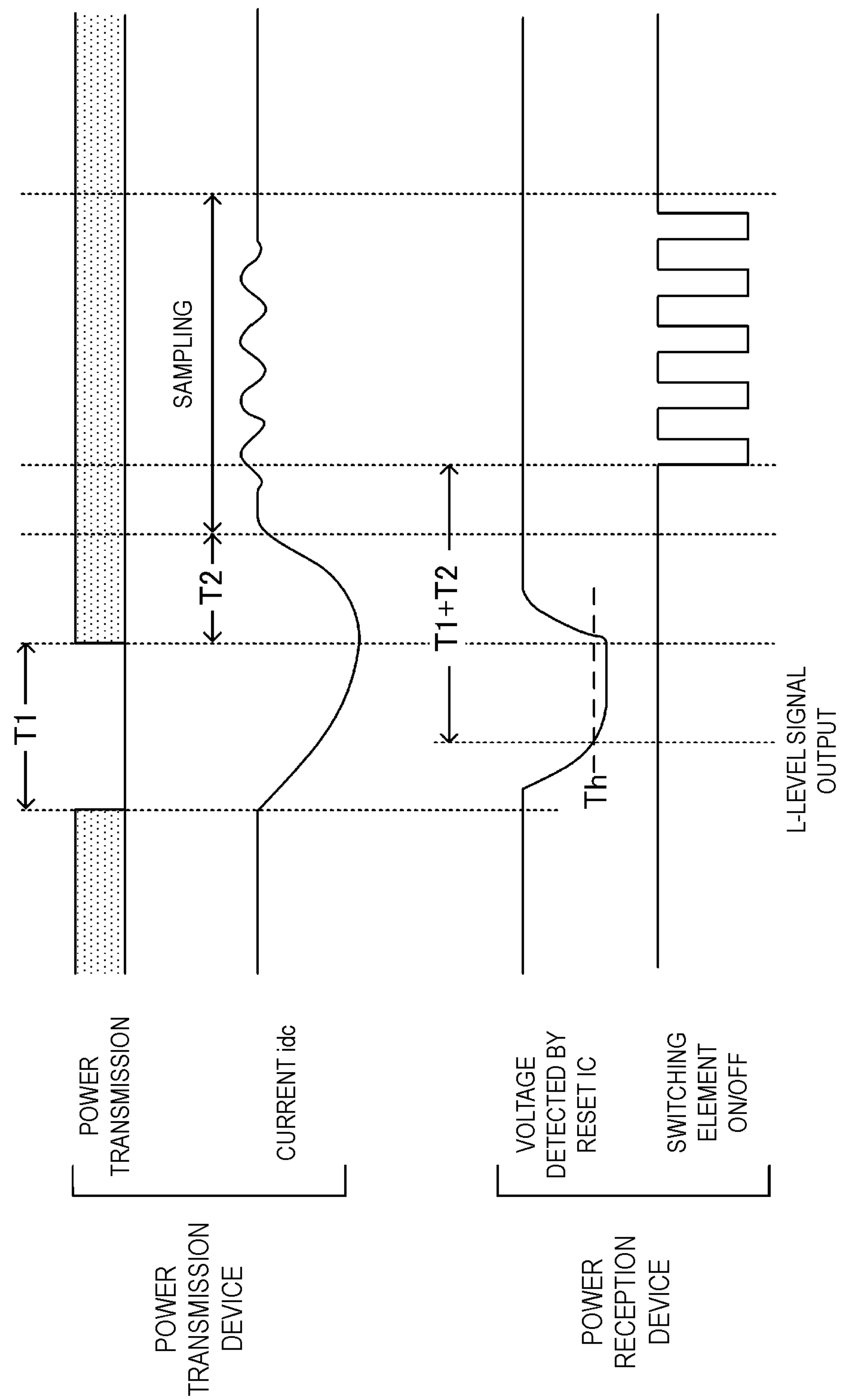
FIG. 2 is an illustration for describing timing at which a signal is transmitted from the power reception device to the power transmission device.

FIG. 2 is an illustration for describing timing at which a signal is transmitted from the power reception device 201 to the power transmission device 101.

In the power transmission device 101, the control circuit 14 performs switching control on the switching circuit 13, thus enabling a resonant current to flow in the power transmission resonant circuit 11. The power transmission resonant circuit 11 and the power reception resonant circuit 21 become electromagnetic-field coupled to each other, and power is transmitted from the power transmission device 101 to the power reception device 201. The power transmission device 101 requests the power reception device 201 to transmit a signal every predetermined time (e.g., every 10 seconds) while transmitting the power.

To request transmission of a signal, the power transmission device 101 causes a momentary power interruption for time T1. That is, the control circuit 14 stops the switching control for the switching circuit 13 and stops power transmission. Then, the input direct current idc decreases with the lapse of time.

When a momentary power interruption occurs in the power transmission device 101 and the power transmission from the power transmission device 101 stops, no voltage is induced in the power reception coil 20 in the power reception device 201. Then, with the decrease in the input direct current idc, the voltage level in the power source line in the power reception device 201 also decreases. When the reset IC 28 detects that the voltage level becomes lower than the threshold Th, it outputs an L-level signal.

After the lapse of time (T1+T2) from the receipt of the L-level signal from the reset IC 28, the transmission signal control circuit 27 in the power reception device 201 performs on-off control on the switching element Q2 for a predetermined time. This changes the input impedance, and the power reception device 201 transmits a signal of "1" or "0" to the power transmission device 101.

After the lapse of the time (T1+T2) from the initiation of the momentary power interruption, that is, after a wait of the time T2 from the end of the momentary power interruption for the time T1, the control circuit 14 in the power transmission device 101 starts sampling. That is, the control circuit 14 detects the input direct current idc and reads a signal transmitted from the power reception device 201 from "1" or "0" obtained by comparison with the threshold.

The time for which the sampling is performed is set in advance together with the time for which the power reception device 201 transmits a signal.

In this way, the momentary power interruption caused by the power transmission device 101 triggers the power reception device 201 to start transmitting a signal. Thus, because the power transmission device 101 can grasp timing at which the power reception device 201 transmits the signal, it can perform sampling in accordance with the timing. Accordingly, the power transmission device 101 does not need to continuously perform sampling, and this can lead to reduction in needless power consumption. The momentary power interruption caused by the power transmission device 101 is used as a trigger to start transmitting a signal, and the trigger can be easily generated.

In addition, the power transmission device 101 starts sampling after the lapse of certain time (T1+T2) from the initiation of the momentary power interruption. After the voltage level in the power source line becomes lower than the threshold Th because of the momentary power interruption (after the reset IC 28 outputs an L-level signal), after the lapse of certain time (T1+T2), the power reception device 201 turns on or off the switching element Q2 and starts transmitting a signal. That is, the timing at which the power transmission device 101 starts sampling is earlier than the timing at which the power reception device 201 starts transmitting a signal. This can prevent the power transmission device 101 from failing to detect the transmitted signal.

Figure 3:
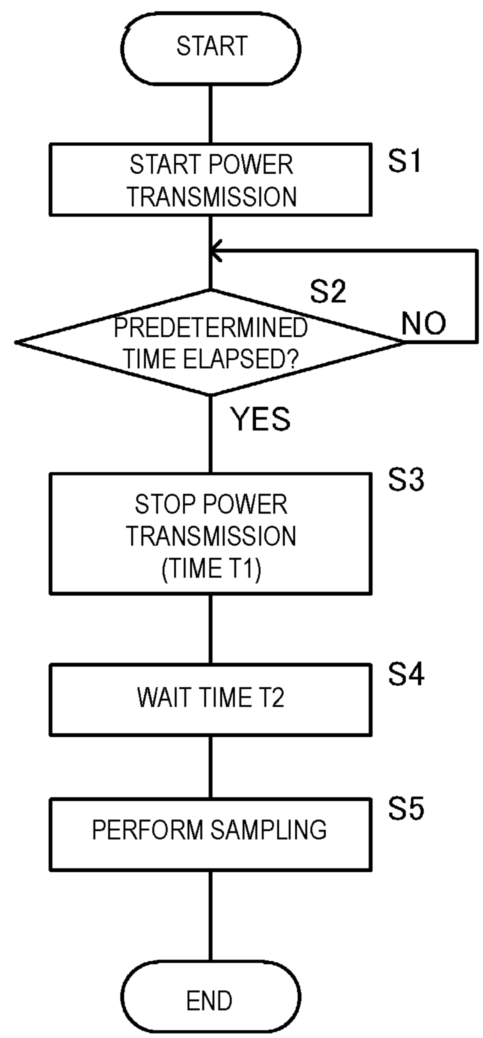
FIG. 3 is a flow chart of processing performed in the power transmission device.

FIG. 3 is a flow chart of processing performed in the power transmission device 101.

The power transmission device 101 performs switching control on the switching circuit 13 by the control circuit 14 and transmits power (S1). The control circuit 14 determines whether a predetermined time (e.g., 10 seconds) has elapsed from previous momentary power interruption processing (S2). When the predetermined time has not elapsed (No at S2), the control circuit 14 waits until the predetermined time elapses. When the predetermined time has elapsed (Yes at S2), the control circuit 14 stops the switching control for the switching circuit 13 and stops (momentarily interrupts) power transmission for the time T1 (S3). After waiting the time T2 (S4), the control circuit 14 detects the input direct current idc and performs sampling of reading a signal transmitted from the power reception device 201 from "1" or "0" obtained by comparison with the threshold (S5).

The power transmission device 101 performs processing, such as stopping or limiting power transmission to the power reception device 201, on the basis of the content of the signal obtained from the sampling.

Figure 4:
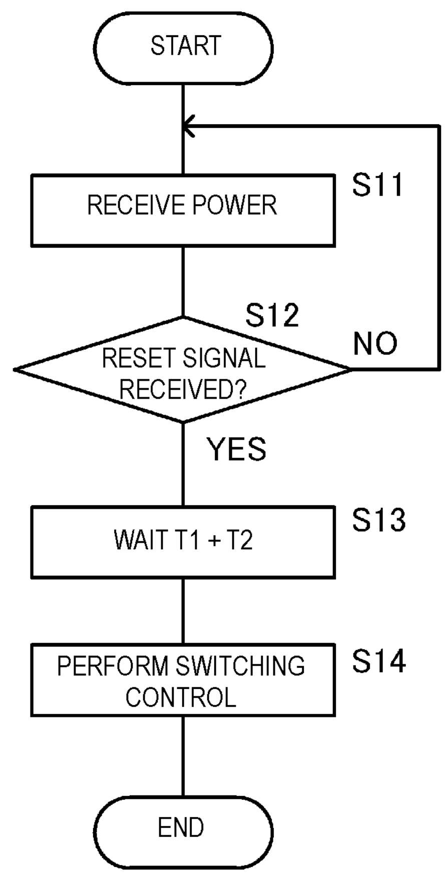
FIG. 4 is a flow chart of processing performed in the power reception device.

FIG. 4 is a flow chart of processing performed in the power reception device 201.

The power reception device 201 receives power transmitted from the power transmission device 101 (S11). The transmission signal control circuit 27 determines whether it has received an L-level signal (reset signal) from the reset IC 28 (S12). As previously described, the reset IC 28 outputs the L-level signal when the voltage level in the power source line becomes lower than the threshold Th.

When no reset signal has been received from the reset IC 28 (No at S12), the power reception device 201 receives power transmitted from the power transmission device 101 (S11). When the reset signal has been received from the reset IC 28 (Yes at S12), the transmission signal control circuit 27 waits time (T1+T2) (S13) and then performs switching control on the switching element Q2 (S14). This switching control is based on a signal to be transmitted to the power transmission device 101.

The description on the above-described embodiment is illustrative in all respects and is not restrictive. Modifications and changes may be made by those skilled in the art. The scope of the present disclosure is indicated by the claims rather than by the above-described embodiment. Furthermore, the scope of the present disclosure is intended to encompass changes from the embodiment within the meaning and scope equivalent to the claims.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A wireless power feeding system comprising:

a power transmission device including a power transmission coil and a power transmission circuit configured to supply high-frequency power to the power transmission coil; and a power reception device including a power reception coil electromagnetic-field coupled to the power transmission coil and a power reception circuit configured to convert the high-frequency power received by the power reception coil into direct-current power, the power reception device being connected to a load circuit that consumes the direct-current power, wherein the power transmission circuit in the power transmission device is configured to switch from supplying of the high-frequency power to the power transmission coil to stopping supplying of the high-frequency power to the power transmission coil, the power reception device further includes a switching detection circuit configured to detect the switching from supplying of the high-frequency power to stopping supplying of the high-frequency power at the power transmission circuit, and a transmission signal control circuit configured to, when the switching detection circuit detects the switching, start transmission of a signal to the power transmission device by way of the power reception coil by changing an input impedance seen from the power transmission circuit to a side where the load circuit is disposed, the change of the input impedance being performed on the basis of a content of the signal to be transmitted to the power transmission device, the power transmission device further includes a signal obtaining portion configured to, after the switching, start obtaining the content of the signal by detecting the change of the input impedance, the signal obtaining portion is configured, before the switching, not to obtain the content of the signal, and the signal includes information on charging of the load circuit, and no information on charging of the load circuit is being obtained by the signal obtaining portion before the switching.

2. The wireless power feeding system according to claim 1, wherein the stopping of the supplying of the high-frequency power to the power transmission coil is a momentary power interruption.

3. The wireless power feeding system according to claim 1, wherein the signal obtaining portion detects the change in the input impedance after a lapse of a predetermined time after the power transmission circuit switches the high-frequency power.

* * * * *